United States Patent
Pialot et al.

(10) Patent No.: US 10,808,083 B2
(45) Date of Patent: Oct. 20, 2020

(54) METHOD AND DEVICE FOR PRODUCING A RUBBER MIXTURE IN A LIQUID PHASE

(71) Applicant: COMPAGNIE GENERALE DES ETABLISSEMENTS MICHELIN, Clermont-Ferrand (FR)

(72) Inventors: Frederic Pialot, Clermont-Ferrand (FR); Fabrice Surleau, Clermont-Ferrand (FR); Stephane Nebout, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 31 days.

(21) Appl. No.: 15/748,915

(22) PCT Filed: Jul. 26, 2016

(86) PCT No.: PCT/EP2016/067802
§ 371 (c)(1),
(2) Date: Jan. 30, 2018

(87) PCT Pub. No.: WO2017/021219
PCT Pub. Date: Feb. 9, 2017

(65) Prior Publication Data
US 2019/0002650 A1    Jan. 3, 2019

(30) Foreign Application Priority Data

Jul. 31, 2015  (FR) .................................... 15 57362
Dec. 18, 2015  (FR) .................................... 15 62793

(51) Int. Cl.
| | | |
|---|---|---|
| C08J 3/22 | (2006.01) | |
| C08J 3/215 | (2006.01) | |
| B29B 7/74 | (2006.01) | |
| B29B 7/32 | (2006.01) | |
| C08K 3/04 | (2006.01) | |
| C08L 21/02 | (2006.01) | |

(52) U.S. Cl.
CPC ................. C08J 3/226 (2013.01); B29B 7/32 (2013.01); B29B 7/7495 (2013.01); C08J 3/215 (2013.01); C08J 2421/00 (2013.01); C08K 3/04 (2013.01); C08L 21/02 (2013.01)

(58) Field of Classification Search
CPC ........ C08J 3/215; C08J 3/226; C08J 2421/00; B29B 7/32; B29B 7/7495
See application file for complete search history.

(56) References Cited

U.S. PATENT DOCUMENTS

| | | | |
|---|---|---|---|
| 6,048,923 A | 4/2000 | Mabry et al. | |
| 6,372,822 B1* | 4/2002 | Chung | B29B 7/002 523/351 |
| RE42,099 E | 2/2011 | Chung et al. | 523/333 |
| 9,115,258 B2 | 8/2015 | DeGaudemaris et al. | |
| 2002/0086917 A1 | 7/2002 | Chung et al. | 523/351 |
| 2006/0079608 A1 | 4/2006 | Chung et al. | 523/351 |
| 2012/0172492 A1 | 7/2012 | Wang et al. | 523/352 |
| 2012/0277344 A1 | 11/2012 | Wang et al. | 523/157 |
| 2015/0038617 A1 | 2/2015 | DeGaudemaris et al. | |
| 2015/0105491 A1 | 4/2015 | Wang et al. | C08J 3/203 |
| 2015/0337091 A1 | 11/2015 | Wang et al. | C08J 5/02 |

FOREIGN PATENT DOCUMENTS

FR      2981076 A1    4/2013

OTHER PUBLICATIONS

International Search Report dated Oct. 17, 2016, issued by EPO in connection with International Application No. PCT/EP2016/067802.

* cited by examiner

Primary Examiner — Edward J Cain
(74) Attorney, Agent, or Firm — Venable LLP

(57) ABSTRACT

A process and device continuously prepare a filled rubber masterbatch. The process comprises bringing into contact, in a mixing zone, a first liquid-phase flow and a second liquid-phase flow, the first flow being an elastomer emulsion, the second flow being an aqueous suspension of filler particles, such that one of the two flows emerges inside the other flow and that the two flows are transported at low pressure before they are brought into contact.

16 Claims, 5 Drawing Sheets

C-C CROSS SECTION

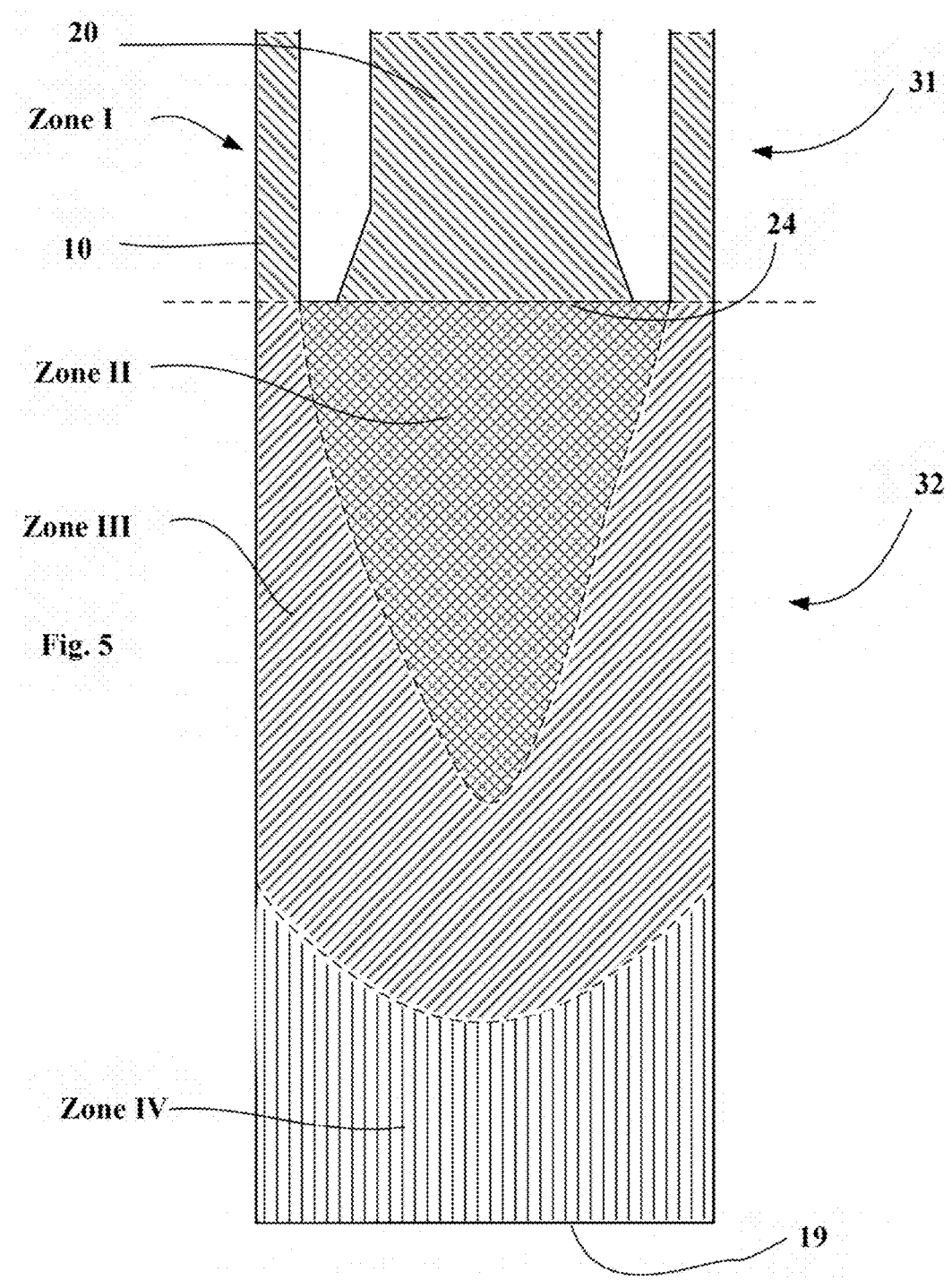

METHOD AND DEVICE FOR PRODUCING A RUBBER MIXTURE IN A LIQUID PHASE

FIELD OF THE INVENTION

The invention relates to the field of preparing rubber compounds, in particular the preparation of a diene elastomer/filler masterbatch.

PRIOR ART

The term "masterbatch" is understood to mean an elastomer-based composite into which an organic or inorganic filler and possibly other additives have been introduced.

The masterbatches are then used for the manufacture of reinforced diene rubber compositions, intended for example for the manufacture of tyres or of semi-finished products for tyres, these semi-finished products being for example profiled products such as treads or reinforcing plies for these tyres.

To obtain the optimum reinforcing properties conferred by a filler in a rubber composition, it is known that it is generally advisable for this filler to be present in the elastomer matrix in a final form which is both as finely divided as possible and as uniformly distributed as possible. However, such conditions can be achieved only when this filler has a very good ability, on the one hand, to be incorporated into the matrix during mixing with the elastomer and to be deagglomerated and, on the other hand, to be uniformly dispersed in this matrix.

As is known, carbon black has such capabilities, which is in general not the case of inorganic fillers, particularly silicas. This is because, for reciprocal affinity reasons, these inorganic filler particles have an annoying tendency to clump together in the elastomer matrix. Such interactions have the deleterious consequence of limiting the dispersion of the filler and therefore the reinforcing properties to a level substantially below that which it would be theoretically possible to achieve if all the (inorganic filler/elastomer) bonds capable of being created during the compounding operation were actually obtained. These interactions moreover tend to increase the viscosity in the uncured state of the rubber compositions and therefore to make them more difficult to process than when carbon black is present.

Document U.S. Pat. No. 6,048,923 describes a process for continuously preparing a filled rubber masterbatch that consists in bringing into contact, in a mixing zone, a first liquid-phase flow and a second liquid-phase flow, the first flow being an elastomer emulsion, the second flow being an aqueous suspension of filler particles, in which the second flow is introduced under very high pressure into the mixing zone in order to form a stream sufficiently energetic to entrain the first flow and substantially completely coagulate the elastomer with the filler particles and in which the fillers used are particles of carbon black.

BRIEF DESCRIPTION OF THE INVENTION

The applicant has discovered a simplified method for obtaining a masterbatch.

The process according to one of the subjects of the invention consists, as indicated in the document above, in bringing into contact, in a mixing zone, a first liquid-phase flow and a second liquid-phase flow, the first flow being an elastomer emulsion, the second flow being an aqueous suspension of filler particles. This process is characterized in that one of the two flows emerges inside the other flow and in that the two flows are transported at low pressure before they are brought into contact.

Surprisingly, the fact of making one of the flows emerge into the second and of transporting them at low pressure makes it possible to obtain, downstream of the contacting zone, an excellent dispersion of the filler particles in the elastomer emulsion.

Low pressure is understood to mean pressures for transporting the first and second flows in the zone upstream of the mixing zone of less than 2 bar and preferably less than 1.5 bar. The pressure drop inside the device is thus less than 1 bar.

This greatly simplifies the devices for transporting the two flows.

Preferably, upstream of the mixing zone, the first flow having a first flow area, the second flow has a second flow area greater than the first in a ratio of between 5 and 8.

Alternatively or concomitantly, preferably, upstream of the mixing zone, the first flow having a first flow rate, the second flow has a second flow rate greater than the first in a ratio of between 4 and 15.

It has been observed that when the ratio of the flow areas is within the range indicated, it is possible to vary the flow rates over a very broad range, by a factor of greater than 6 while retaining a very high coagulation yield, of greater than 80%.

Similarly, it has been observed that this process can be applied with ratios of the flow rates that are very varied, in relation to the filler content of the masterbatch, for example from 20 to 120 phr (parts per hundred parts of elastomer, by weight) while retaining, as previously indicated, a very high coagulation yield. It is recalled that the coagulation yield corresponds to the ratio of the dry weight recovered to the weight targeted at the start, multiplied by one hundred.

This ratio of the flow areas also enables a first adjustment of the respective concentrations of elastomer and of filler in the masterbatch to be produced. A finer adjustment is linked to the respective concentrations of elastomer and of filler in the flows and also to the respective flow rates of the two flows.

According to one preferred embodiment, the first flow emerges inside the second flow.

As the flow area of the first flow is much smaller than that of the second, this embodiment is simpler to carry out.

Advantageously, the mixture of the two flows emerges into the open air.

Advantageously, the process according to one of the subjects of the invention additionally comprises a step of agitating the mixture resulting from the contacting step with a minimum shear rate of the order of 10 $s^{-1}$ in order to initiate a coagulation of the materials of said mixture and obtain a coagulated mixture.

This agitating step may be carried out by a rocking table or an oscillating belt.

It may also be carried out by a rotary agitator.

Advantageously, the coagulated mixture is then poured onto a conveyor.

Preferably, on leaving the conveyor, the coagulated mixture is drained by pressing in order to obtain a drained mixture.

This draining is carried out using a device selected from the group consisting of the following devices: conical screw extruder, piston, twin-screw extruder with water discharge systems.

The drained mixture is then advantageously dried by bringing it to a temperature above the evaporating temperature of the water.

A masterbatch of elastomer and filler particles is then obtained that is ready to receive additional additives such as the crosslinking system before being shaped and being used in the manufacture in particular of a pneumatic tyre or any other rubber object.

According to one preferred embodiment, the preparation of the second flow comprises a step of breaking up the filler aggregates of the second flow.

The process according to one of the subjects of the invention makes it possible to use fillers selected from the group consisting of carbon blacks, silicas, kaolin, chalk, synthetic organic fillers, natural organic fillers and mixtures thereof.

This process therefore has a very broad use. In the case of fillers such as silicas, the first flow may advantageously comprise agents that facilitate the coagulation after the two flows have been brought into contact, such as metal salts or coupling agents as indicated in document FR 2 981 076.

Another subject of the invention is a device for continuously preparing a filled rubber masterbatch, comprising a feed zone with means for transporting, in a first pipe, a first flow of an elastomer emulsion and means for transporting, in a second pipe, a second flow of an aqueous suspension of filler particles, a parallel-flow zone of the first and second flows in which the pipe of smaller cross section is positioned inside the pipe of larger cross section, and a mixing zone downstream of the parallel-flow zone formed by the internal cavity of the pipe of larger cross section downstream of the end of the pipe of smaller cross section.

Advantageously, the pipe of larger cross section is the second pipe.

According to one advantageous embodiment, the two pipes upstream of the mixing zone are coaxial.

Very advantageously, the two pipes each have a circular cross section.

Preferentially, in the parallel-flow zone, the first flow having a first flow area, the second flow has a second flow area greater than the first in a ratio of between 5 and 8.

Preferentially, D being the internal diameter of the pipe of larger diameter and L being the length of the mixing zone, the ratio L/D is variable and is preferably between 0.5 and 3.

Below 0.5, the homogeneity of the masterbatch obtained may be insufficient and above 3, it is observed that the coagulation of the masterbatch becomes significant in the mixing zone.

Very preferentially, H being the length of the parallel-flow zone and D the diameter of the pipe of largest diameter, the ratio H/D is greater than 1. This allows laminar flows to be found in the parallel-flow zone.

DESCRIPTION OF THE FIGURES

The various objects of the invention are now described with the aid of the appended drawing, in which:

FIGS. 5 and 6 very schematically present the types of flows and also the change in the weight fraction of the two materials in contact in the mixing device obtained with fluidics software.

DETAILED DESCRIPTION OF THE INVENTION

Figure 1:
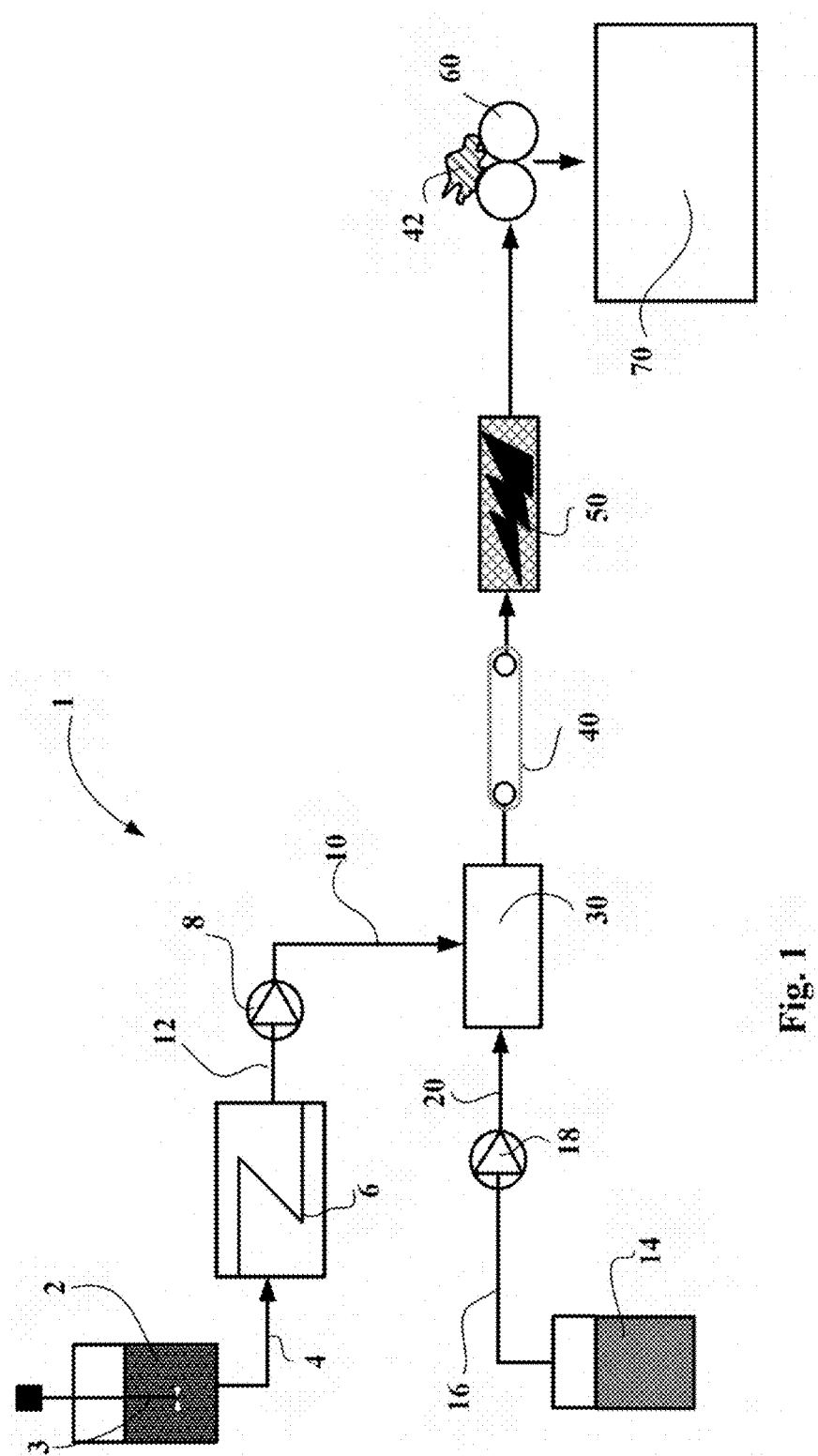
FIG. 1 presents a diagram of the whole of a facility for preparing rubber masterbatches.

FIG. 1 presents an embodiment of a facility 1 for preparing a filled rubber masterbatch.

The facility comprises a first tank 14 filled with an elastomer emulsion. The pipe 16 connects the tank 14 to a peristaltic pump 18 intended to very precisely meter the volume of elastomer emulsion introduced into the mixer 30 via the pipe 20.

The facility 1 also comprises a second tank 2 filled with filler particles pre-dispersed in water. Preferably, the dispersion of the filler particles is maintained with the aid of a rotary agitator 3. It is also possible to use an ultrasonic probe. A pipe 4 transports the aqueous dispersion of fillers to a Microfluidizer® 6 in order to break up the filler aggregates remaining in the dispersion. The pipe 12 connects the outlet of the Microfluidizer® 6 to a peristaltic pump 8 intended to very precisely meter the volume of the aqueous dispersion of fillers introduced into the mixer 30 via the pipe 10.

At the outlet of the mixer 30 there is a conveyor, preferably a vibrating belt 40 intended to initiate or accelerate the coagulation by agitation of the filled rubber compound. Next a conical screw extruder 50 makes it possible to drain then dry the coagulated mixture. Next there is a twin-screw extruder 60 in order to prolong the drying of the coagulated mixture 42 and obtain a masterbatch 70 capable of receiving the additional additives such as the crosslinking system on an open mill for example (not represented).

Figure 2:
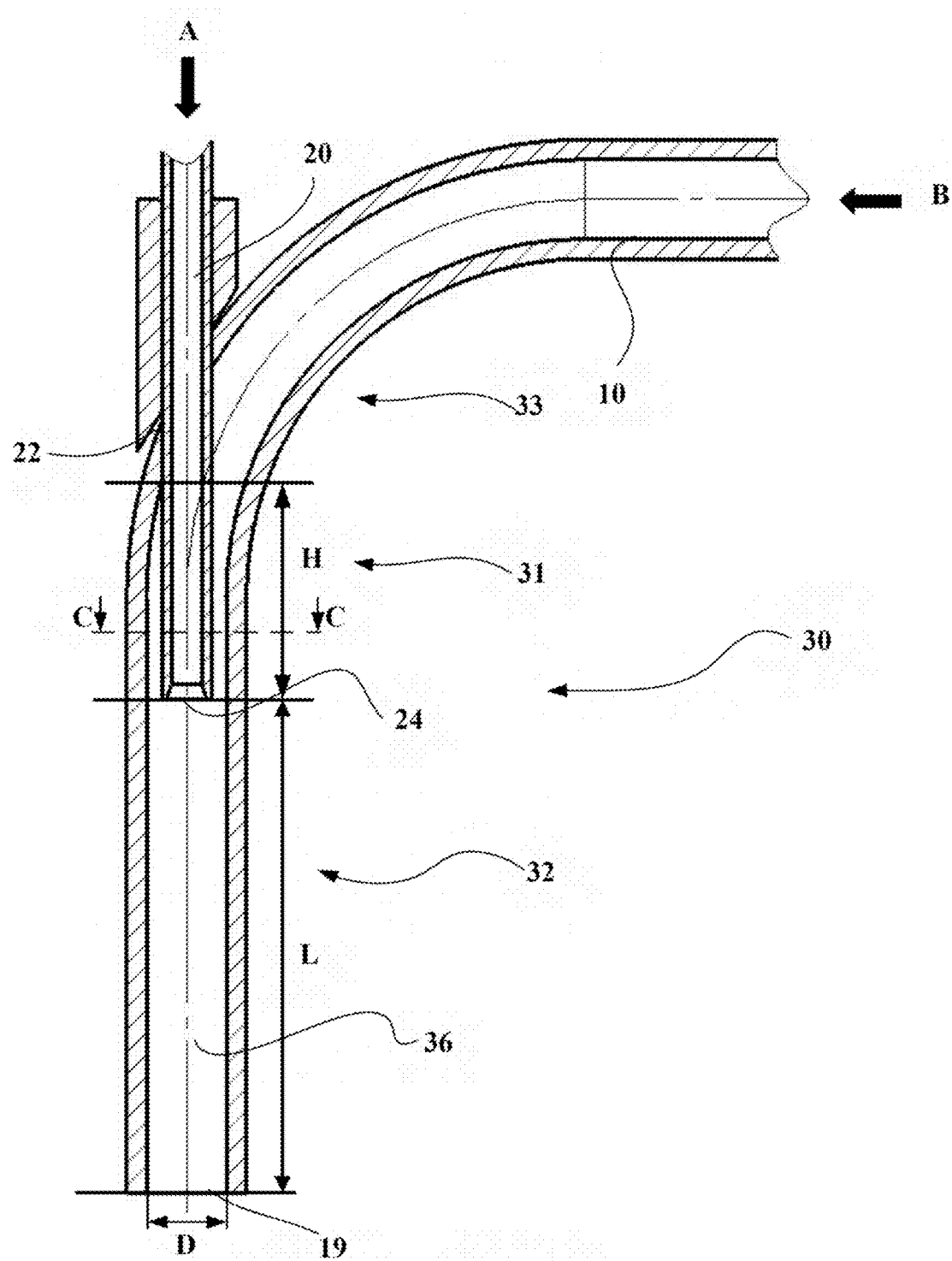
FIG. 2 presents a simplified cross-sectional view of a mixing device according to one of the subjects of the invention.

FIG. 2 presents a cross-sectional view of the mixer 30 according to one subject of the invention.

The mixer 30 comprises a feed zone 33, a parallel-flow zone 31 and a mixing zone 32.

The feed zone 33 comprises the two pipes 20 and 10 which respectively transport the flows of elastomer emulsion and of aqueous suspension of filler particles or filler slurry and also the zone 22 where the pipe 20 penetrates into the pipe 10 of larger diameter. The arrow A indicates the direction of the flow of the elastomer emulsion in the pipe 20 and the arrow B the direction of the flow of the filler slurry in the pipe 10.

The parallel-flow zone 31 is downstream of the zone 22. The two pipes 10 and 20 are coaxial in this zone which finishes at the end 24 of the pipe 20.

The mixing zone 32 is downstream of the parallel-flow zone 31. This zone starts at the end 24 of the pipe 20 and finishes at the end 19 of the pipe 10. This zone is therefore formed by the inner wall of the pipe of larger cross section 10 upstream of the parallel-flow zone 31. The mixing zone 32 emerges at 19 into the open air.

In this example embodiment, the pipe of larger cross section is the pipe 10 which transports the aqueous suspension of filler particles and the two pipes both have a circular cross section.

Figure 4:
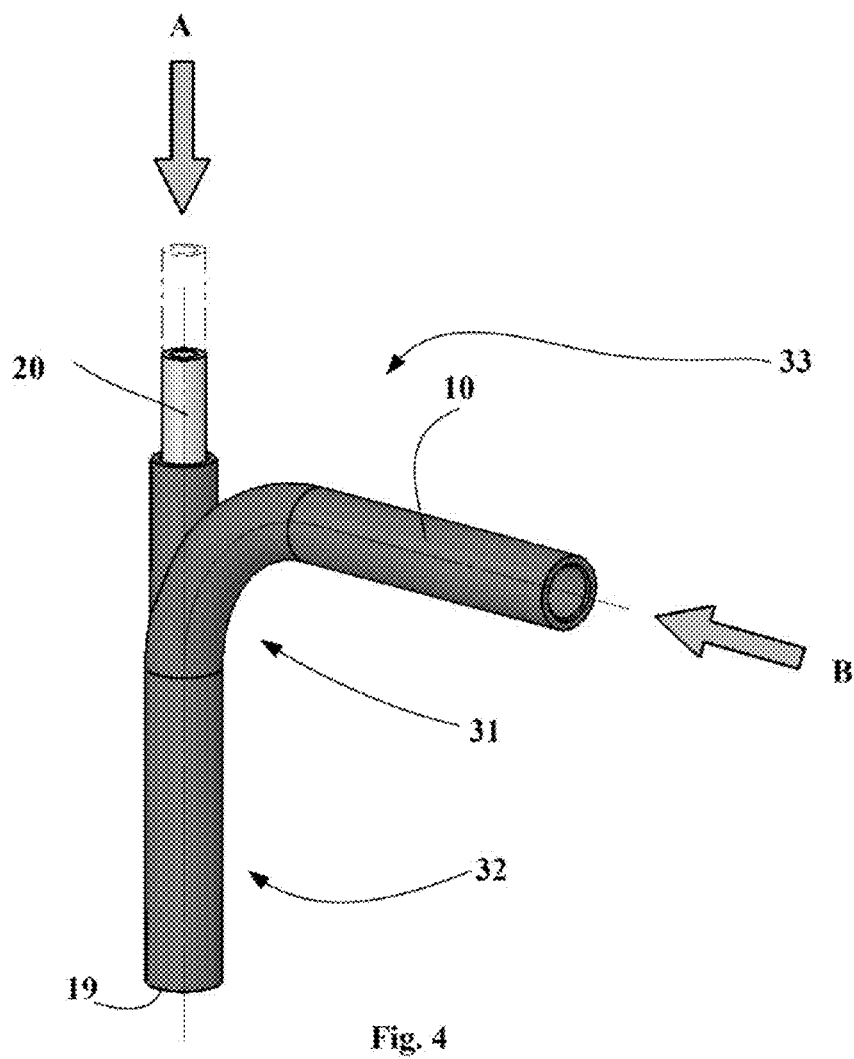
FIG. 4 presents a perspective view of the mixing device from FIG. 2.

FIG. 4 presents a perspective view of a mixer 30 with the feed zone 33 comprising the pipes 10 and 20, the parallel-flow zone 31 and the mixing zone 32 with its end 19. This figure illustrates that the length of the mixing zone can easily be adjusted by making the pipe 20 slide more or less into the opening of the pipe 10 starting from a first position illustrated by dotted lines.

As in FIG. 2, the two arrows A and B indicate the directions of the two flows.

The two flows are conveyed by means of peristaltic type pumps. These pumps make it possible to control their respective flow rates with great precision and have the advantage of preventing any contamination of the flows.

FIGS. 2 and 4 show the introduction of the pipe 20 into the pipe 10, that is to say that the elastomer emulsion of 20 is introduced into the filler slurry of 10. This is the preferred embodiment.

Figure 3:
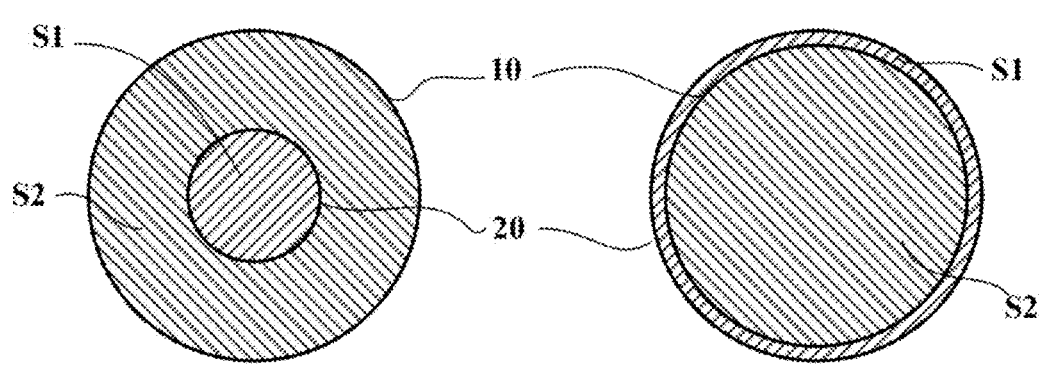
FIGS. 3A and 3B present, seen in cross section, two embodiments of the device from FIG. 2.

FIG. 3A is a C-C cross section of the parallel-flow zone 31 of the device 30 as indicated in FIG. 2. The pipe 10 is the pipe of larger diameter and conveys the filler slurry flow. The pipe 20 is the pipe of smaller diameter that conveys the elastomer emulsion flow. The pipe 20 of flow area S1 is positioned in the centre of the pipe 10. The flow of the filler slurry has a flow area S2. In the example presented, the diameter of the pipe 10 is 10 mm and that of the pipe 20 is 4 mm. The ratio S2/S1 is here equal to 5.2.

It is also possible to reverse the two pipes while satisfying the desired ratios of 5 to 8 for the flow areas in the parallel-flow zone 31. An example is presented in FIG. 3B. In this case, it is the pipe 10 which penetrates into the pipe 20 to form the parallel-flow zone and the mixing zone. In the example presented, the diameter of the pipe 20 is 10 mm, that of the pipe 10 is 9.2 mm, the ratio of the flow areas is similar to that of FIG. 3A and is equal to 5.5. It is seen that the diameters of the two pipes are very similar which may be less easy to produce in a robust manner, especially when the ratio of the flow areas increases.

The introduction, in the zone 22, of the pipe 20 into the pipe 10 so that the two pipes are coaxial makes it possible to obtain a zone in which the two flows are parallel. After a disturbance zone linked to the introduction of the pipe 20, the two flows are preferably laminar.

At the end 24 of the pipe 20, the two flows are brought into contact and the mixing begins.

Table 1 presents the operating conditions for an exemplary embodiment of a masterbatch according to one of the subjects of the invention.

TABLE 1

|  | Carbon black slurry | Latex emulsion |
| --- | --- | --- |
| Filler content of the slurry or solids content of the latex | 4% | 60% |
| Viscosity of the flows (cP) | 17 | 55 |
| Density of the flows | 1 | 1 |
| Transporting pressure upstream of the mixing zone (bar) | 1 | 1 |
| Flow rates (ml/min) | 530 | 80 |
| Total flow rate (ml/min) | 610 | |
| Temperature of the flows (° Celsius) | 30 | |
| Internal diameter of the pipes (mm) | 10 | 5 |
| Material of the pipes | Stainless steel 304L | |

The filler slurry pipe has an internal diameter of 10 mm and that of the latex emulsion is 5 mm. The ratio S2/S1 is thus 3.

The filler slurry flow is composed of 4% by weight of carbon black and 96% of water.

The latex emulsion flow is composed of 60% by weight of latex and 40% of water.

The pressure for transporting the two flows was measured in the parallel-flow zone in the immediate vicinity of the mixing zone. These two pressures are 1 bar. These transporting pressures are relative pressures with respect to atmospheric pressure. They are therefore 2 bar as an absolute value.

A clear difference in the viscosity of the two flows was observed and the ratio of the flow rates is 6.6.

It should be noted that the temperature rise linked to the mixing is very limited due to the not very energetic nature thereof: the temperature of the flows is 30 degrees Celsius.

FIG. 45 very schematically presents the modes of flow of the two flows at the end of the parallel-flow zone 31 and in the mixing zone 32.

Four main zones are distinguished:
- a zone I of laminar flows of the two elastomer emulsion and filler slurry flows in the parallel-flow zone 31;
- a zone II of highly turbulent flow in the central part of the first part of the mixing zone 32 adjacent to the parallel-flow zone 31;
- a zone III of turbulent flow in the lateral parts of the first part of the mixing zone 32; and
- a zone IV of laminar flow in the part of the mixing zone 32 near the end 19 of the pipe 10.

The length of the mixing zone is adjusted so that at the end 19 of the pipe 10 the mixture of the two flows is not coagulated but still liquid.

Figure 6:
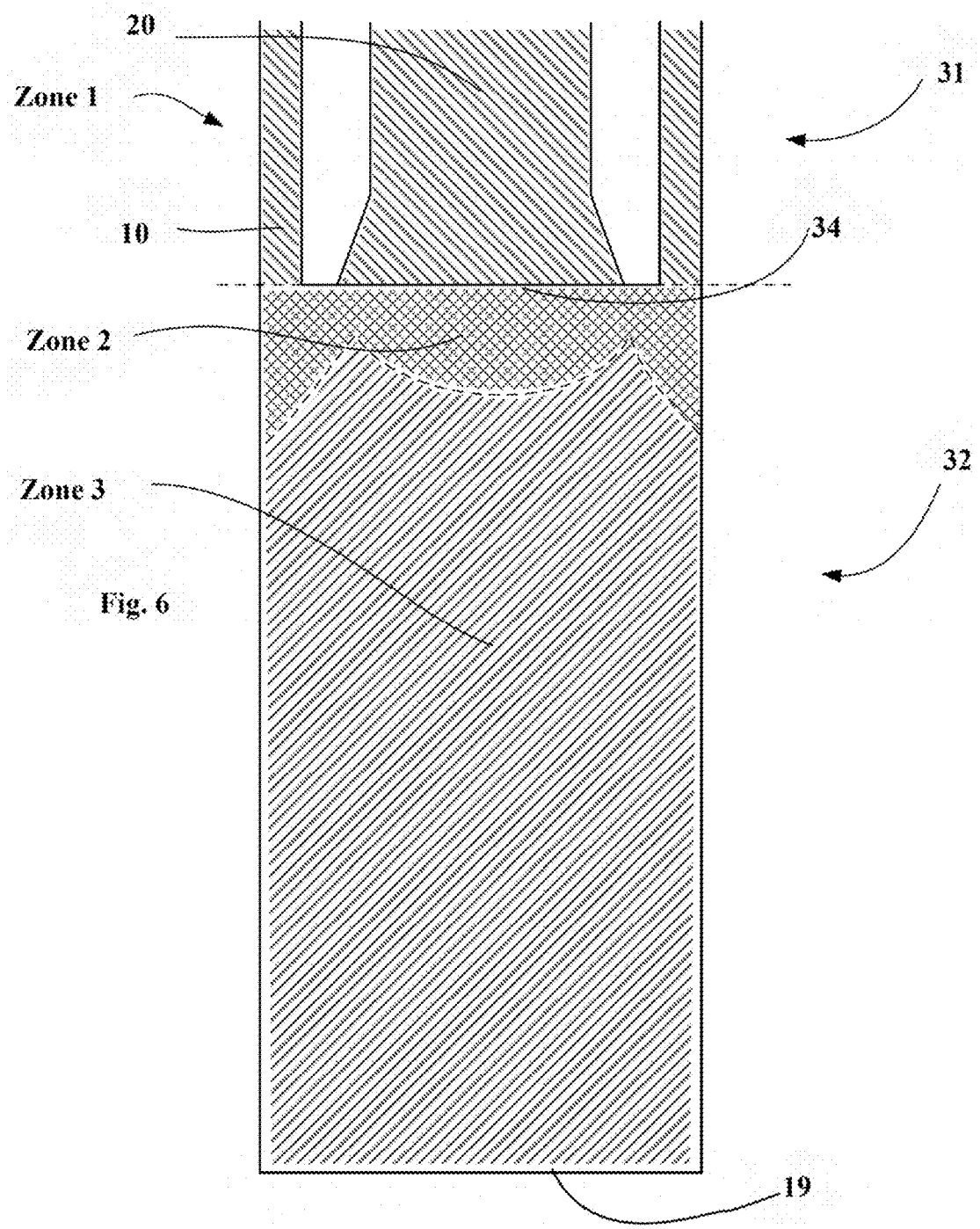

FIG. 6 presents the change in the weight fraction of the two flows obtained with the same fluidic software as FIG. 5.

Three main zones are distinguished:
- zone 1: before the contacting zone, the two flows are "pure" and homogeneous;
- zone 2: zone of very rapid variation of the weight fraction of the two flows, it is observed that this zone 2 is relatively limited;
- zone 3: the weight fraction is virtually homogeneous throughout this third zone and the dispersion of the filler particles in the latex matrix is excellent.

It should be noted that the coagulation of the mixture obtained does not start or virtually does not start in the mixing zone but only in the vibrating conveyor 40 that receives it. It is observed that as soon as this liquid is deposited on this vibratory conveyor 40 there is immediate bulk coagulation.

In order to illustrate the operation of the mixer 30, tests were carried out by varying the ratio of the flow areas from 4 to 12.3, while maintaining the ratio of the flow rates between the two flows at 6.9 in order to obtain a filler content of 45 phr of the masterbatch obtained for two types of carbon blacks, N134 and CRX 1346, the filler content of the slurry being 4% and the natural rubber latex emulsion having a solids content of 60%.

The results obtained show a stability of the coagulation yields at a high value of greater than 80%.

Similar tests were carried out with silica 160MP as filler, with a ratio of the flow rates between the two flows at 4.1 in order to obtain a filler content of 50 phr of the masterbatch obtained, the filler content of the slurry being 7.4% and the natural rubber latex emulsion having a solids content of 60%; the total flow rates also varied by a factor of 6.

The results obtained also show stability of the coagulation yield at a high value close to 90% in this case of using silica as filler.

While retaining one and the same ratio of the flow areas and also the same filler slurry and natural rubber latex compositions, the ratios of the flow rates were varied in order to define the minimum and maximum filler contents of the masterbatches that it is possible to produce.

In the case of the black N134, excellent values of the coagulation yield were obtained between 20 and 120 phr of the masterbatch, of greater than 80%.

In the case of the black CRX 1346, the range of the filler content of the masterbatch obtained was between 25 and 120 phr.

Lastly, in the case of the silica MP160, a range of 10 to 100 phr was observed.

It was also observed that beyond a ratio of the flow areas of 8, the high values of these ranges decrease very greatly.

The mixer 30 therefore has several very important advantages, low energy requirements due to the flows flowing at very low pressures, of less than 2 bar and even close to atmospheric pressure and very effective micro-turbulences in the zone where the two flows meet.

This mixer also has the advantage of being able to produce mixtures with fillers of very varied natures: carbon black, silica, kaolin, synthetic organic fillers, and natural organic fillers such as wood fibres, cellulose.

The concentrations of the filler slurry may reach 20% by weight depending on the type of filler.

The elastomer emulsions may also be natural rubber latex at different concentrations, for example 30% or 60% by weight, emulsions of SBR, BR, ERA type at concentrations that may also reach 30% or 60% by weight.

The resulting filler contents may be very large. It is possible to produce a masterbatch with contents of 15 to 120 phr of carbon black and for silica contents of 10 to 100 phr.

Another advantage of this mixing device is its great ease of adjustment by varying the penetration depth of the inner pipe in the other pipe, the length of the mixing zone is modified which makes it possible to finely adapt it as a function of the masterbatches to be produced.

The invention claimed is:

1. A process for continuously preparing a filled rubber masterbatch, said process comprising a step of bringing into contact, in a mixing zone, a first liquid-phase flow and a second liquid-phase flow, the first flow being an elastomer emulsion, and the second flow being an aqueous suspension of filler particles,
    wherein one of the two flows emerges inside the other flow, and
    wherein, upstream of the mixing zone, the first and second flows are transported under a pressure of less than 2 bar before being brought into contact.

2. The process according to claim 1, wherein, upstream of the mixing zone, the first flow having a first flow area, the second flow has a second flow area greater than the first flow area in a ratio of between 5 and 8.

3. The process according to claim 1, wherein, upstream of the mixing zone, the first flow having a first flow rate, the second flow has a second flow rate greater than the first flow rate in a ratio of between 4 and 15.

4. The process according to claim 1, wherein the first flow emerges inside the second flow.

5. The process according to claim 1, wherein, upstream of the mixing zone, the first and second flows are transported under a pressure of less than 1.5 bar.

6. The process according to claim 1, wherein the mixture of the two flows emerges into the open air.

7. The process according to claim 1 further comprising a step of agitating the mixture resulting from the contacting step with a minimum shear rate of the order of 10 $s^{-1}$ in order to initiate a coagulation of the materials of said mixture and obtain a coagulated mixture.

8. The process according to claim 7, wherein the agitation is carried out by a rocking table.

9. The process according to claim 7, wherein the agitation is carried out by a rotary agitator.

10. The process according to claim 7, wherein the coagulated mixture is poured onto a conveyor.

11. The process according to claim 7, wherein the agitation is carried out by an oscillating belt.

12. The process according to claim 1 further comprising a subsequent step of draining the coagulated mixture by pressing in order to obtain a drained mixture.

13. The process according to claim 12, wherein the draining is carried out using a device selected from the group consisting of conical screw extruder, piston, and twin-screw extruder with water discharge systems.

14. The process according to claim 12 further comprising a subsequent step of drying the drained mixture by bringing it to a temperature above the evaporating temperature of the water.

15. The process according to claim 1, wherein preparation of the second flow comprises a step of breaking up the filler aggregates of said second flow.

16. The process according to claim 1, wherein the fillers are selected from the group consisting of carbon blacks, silicas, kaolin, chalk, synthetic organic fillers, natural organic fillers and mixtures thereof.

* * * * *